United States Patent
Lim et al.

(10) Patent No.: US 10,872,428 B2
(45) Date of Patent: Dec. 22, 2020

(54) DISPLAY APPARATUS AND IMAGE PROCESSING METHOD THEREOF

(71) Applicant: SAMSUNG ELECTRONICS CO., LTD., Suwon-si (KR)

(72) Inventors: Hyungjun Lim, Suwon-si (KR); Youngsu Moon, Suwon-si (KR); Taegyoung Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/580,204

(22) Filed: Sep. 24, 2019

(65) Prior Publication Data

US 2020/0320723 A1   Oct. 8, 2020

(30) Foreign Application Priority Data

Apr. 2, 2019 (KR) .......... 10-2019-0038439
Jul. 3, 2019 (KR) .......... 10-2019-0080320

(51) Int. Cl.
*G06K 9/00* (2006.01)
*G06T 7/40* (2017.01)
*G06T 3/40* (2006.01)

(52) U.S. Cl.
CPC ............ *G06T 7/40* (2013.01); *G06T 3/4046* (2013.01); *G06T 3/4053* (2013.01); *G06T 2207/20081* (2013.01); *G06T 2207/20084* (2013.01)

(58) Field of Classification Search
CPC ....... G06T 7/40; G06T 3/4046; G06T 3/4053; G06T 2207/20081; G06T 2207/20084
See application file for complete search history.

(56) References Cited

U.S. PATENT DOCUMENTS

| 7,715,658 B2 | 5/2010 | Cho et al. |
| 8,254,669 B2 | 8/2012 | Nishida |
| 9,235,874 B2 | 1/2016 | Voronov et al. |

(Continued)

FOREIGN PATENT DOCUMENTS

| JP | 2009-95001 A | 4/2009 |
| KR | 10-1174130 B1 | 8/2012 |

(Continued)

OTHER PUBLICATIONS

Communication dated Jan. 2, 2020, issued by the European Patent Office in counterpart European Application No. 19 202 941.1.

(Continued)

*Primary Examiner* — Shefali D Goradia
(74) *Attorney, Agent, or Firm* — Sughrue Mion, PLLC

(57) ABSTRACT

An image processing apparatus and method are provided. The image processing apparatus includes: a memory configured to store at least one instruction, and a processor electrically connected to the memory, wherein the processor, by executing the at least one instruction, is configured to: apply an input image to a training network model; and apply, to a pixel block included in the input image, a texture patch corresponding to the pixel block to obtain an output image, wherein the training network model stores a plurality of texture patches corresponding to a plurality of classes classified based on a characteristic of an image, and is configured to train at least one texture patch, among the plurality of texture patches, based on the input image.

20 Claims, 13 Drawing Sheets

(56) References Cited

U.S. PATENT DOCUMENTS

| | | | |
|---|---|---|---|
| 9,317,781 B2* | 4/2016 | Tu | G06K 9/6259 |
| 10,296,605 B2* | 5/2019 | Barel | G06K 9/228 |
| 10,521,918 B2 | 12/2019 | Lee et al. | |
| 10,565,684 B2* | 2/2020 | Zhang | G06F 16/51 |
| 2004/0218834 A1 | 11/2004 | Bishop et al. | |
| 2007/0217502 A1 | 9/2007 | Ammar et al. | |
| 2009/0074288 A1 | 3/2009 | Nishida | |
| 2010/0173269 A1* | 7/2010 | Puri | G09B 19/0092 |
| | | | 434/127 |
| 2014/0086479 A1 | 3/2014 | Luo et al. | |
| 2014/0301661 A1 | 10/2014 | Voronov et al. | |
| 2014/0321738 A1 | 10/2014 | Shibata et al. | |
| 2015/0003706 A1* | 1/2015 | Eftestol | G06T 7/0012 |
| | | | 382/131 |
| 2015/0310305 A1* | 10/2015 | Fang | G06T 11/001 |
| | | | 345/441 |
| 2016/0019677 A1* | 1/2016 | Dong | G06K 9/52 |
| | | | 382/195 |
| 2016/0027148 A1* | 1/2016 | Choudhury | G06T 5/50 |
| | | | 382/254 |
| 2017/0343481 A1* | 11/2017 | Jahanshahi | G06N 3/0454 |
| 2017/0358090 A1* | 12/2017 | Li | G06T 7/11 |
| 2018/0033156 A1 | 2/2018 | Lee et al. | |
| 2018/0068634 A1 | 3/2018 | Yoo et al. | |
| 2018/0130180 A1 | 5/2018 | Wang et al. | |
| 2018/0165798 A1* | 6/2018 | Lin | G06K 9/6267 |
| 2018/0285679 A1 | 10/2018 | Amitay | |
| 2019/0066274 A1 | 2/2019 | Lim et al. | |
| 2020/0211234 A1 | 7/2020 | Lim et al. | |

FOREIGN PATENT DOCUMENTS

| | | |
|---|---|---|
| KR | 10-1346084 B1 | 12/2013 |
| KR | 10-2014-0121659 A | 10/2014 |
| KR | 10-2015-0129897 A | 11/2015 |
| KR | 10-1635309 B1 | 7/2016 |
| KR | 10-1664743 B1 | 10/2016 |
| KR | 1020170022736 A | 3/2017 |
| KR | 10-2018-0027885 A | 3/2018 |
| WO | 2018/048171 A1 | 3/2018 |
| WO | 2020/138630 A1 | 7/2020 |

OTHER PUBLICATIONS

International Search Report (PCT/ISA/210) dated Jan. 16, 2020 issued by the International Searching Authority in International Application No. PCT/KR2019/013183.

Written Opinion (PCT/ISA/237) dated Jan. 16, 2020 issued by the International Searching Authority in International Application No. PCT/KR2019/013183.

Communication dated Jan. 17, 2020, issued by the European Patent Office in counterpart European Application No. 19 202 941.1.

William T. Freeman et al., "Example-Based Super-Resolution", IEEE Computer Graphics and Applications, IEEE Service Center, Image-Based Modeling, Rendering, and Lighting, vol. 22, No. 2, New York, NY, XP011094241, Mar. 1, 2002, pp. 56-65.

E. Salari et al., "Integrated recurrent neural network for image resolution enhancement from multiple image frames", IEE Proceedings: Vision, Image and Signal Processing, Institution of Electrical Engineers, GB, vol. 150, No. 5, XP006024263, Oct. 22, 2003, pp. 299-305.

Communication dated Sep. 29, 2020, issued by the Korean Intellectual Property Office in counterpart Korean Application No. 10-2019-0080320.

* cited by examiner

Classifier

DISPLAY APPARATUS AND IMAGE PROCESSING METHOD THEREOF

CROSS-REFERENCE TO RELATED APPLICATIONS

This application is based on and claims priority under 35 U.S.C. § 119 to Korean Patent Application No. 10-2019-0038439, filed on Apr. 2, 2019, and Korean Patent Application No. 10-2019-0080320, filed on Jul. 3, 2019, in the Korean Intellectual Property Office, the disclosures of which are incorporated by reference herein in their entireties.

BACKGROUND

1. Field

The disclosure relates to an image processing apparatus and an image processing method thereof, and more particularly, to an image processing apparatus for restoring texture components of an input image and an image processing method thereof.

The disclosure also relates to an artificial intelligence (AI) system that simulates functions, such as recognition and judgment, of a human brain using a machine learning algorithm and its application.

2. Description of Related Art

With the development of electronic technology, various types of electronic apparatuses have been developed and widely used. Particularly, a display apparatus used in a variety places such as a home, an office, and a public place have been developed for years.

Also, high resolution display panels such as a 4K Ultra High Definition (UHD) television (TV), etc., have been widely launched and used. However, high resolution contents of high quality are still lacking. Therefore, various techniques for generating high resolution contents from low resolution contents have been utilized. However, texture loss of contents may occur due to image compression of MPEG/H.264/HEVC, etc., and thus a technique for restoring lost texture components is in demand.

Recently, artificial intelligence systems that implement human-level artificial intelligence (AI) have been used in various fields. An artificial intelligence system is a system in which the machine learns, judges and becomes smart, unlike a related art rules-based smart system. The more the artificial intelligence system is used, the higher the recognition rate and the better the understanding of a user's preferences. Thus, the related art rule-based smart system has been gradually replaced by a deep-learning based artificial intelligence system.

Artificial intelligence technology consists of machine learning (e.g., deep-learning) and element technologies that use machine learning.

Machine learning is an algorithm technology that classifies/trains the characteristics of input data by itself. Element technology is a technology that simulates functions, such as recognition and judgment of the human brain, using a machine learning algorithm such as deep learning and includes linguistic understanding, visual understanding, reasoning/prediction, knowledge representation, motion control, etc.

Artificial intelligence technology may be applied to various fields, examples of which are described below. Linguistic understanding is a technology for recognizing and applying/processing human language/characters, including natural language processing, machine translation, dialogue system, query response, speech recognition/synthesis, and the like. Visual comprehension is a technology for recognizing and processing an object as if perceived by a human being, including object recognition, object tracking, image search, human recognition, scene understanding, spatial understanding, image enhancement, etc. Inference prediction is a technology for judging and logically inferring and predicting information, including knowledge/probability-based reasoning, optimization prediction, preference-based planning, and recommendations. Knowledge representation is a technology for automating human experience information into knowledge data, including knowledge building (data generation/classification) and knowledge management (data utilization). Motion control is a technology for controlling the autonomous movements of a device or object, e.g., travel of a vehicle and the motion of a robot, including motion control (navigation, collision and traveling), operation control (behavior control), and the like.

A related art image processing apparatus has a problem in that a fixed texture patch is applied for restoring lost texture components, or a texture patch less appropriate for an image is applied. Therefore, there is a demand for a technique for generating a texture suitable for the image.

SUMMARY

Provided are an image processing apparatus for enhancing details of an input image by using a texture patch trained based on the characteristic of an input image, and an image processing method thereof.

Additional aspects will be set forth in part in the description which follows and, in part, will be apparent from the description, or may be learned by practice of the presented embodiments.

In accordance with an aspect of the disclosure, there is provided an image processing apparatus, including: a memory configured to store at least one instruction; and at least one processor electrically connected to the memory, wherein the at least one processor, by executing the at least one instruction, is configured to: apply an input image to a training network model, and apply, to a pixel block included in the input image, a texture patch corresponding to the pixel block to obtain an output image, wherein the training network model stores a plurality of texture patches corresponding to a plurality of classes classified based on a characteristic of an image, and is configured to train at least one texture patch, among the plurality of texture patches, based on the input image.

The training network model may be configured to identify a class, among the plurality of classes, based on a characteristic of the pixel block, to obtain a texture patch corresponding to the identified class, to compare a first similarity between the pixel block and the identified class with a second similarity between the texture patch and the identified class, and to determine whether to update the texture patch based on the comparison.

The training network model may be configured to replace the texture patch corresponding to the identified class with the pixel block based on the comparison, or to add the pixel block as another texture patch corresponding to the identified class.

Based on the first similarity being less than the second similarity according to the comparison, the training network model may be configured to maintain the texture patch corresponding to the identified class; and based on the first similarity being greater than the second similarity according to the comparison, the training network model may be configured to update the texture patch based on the pixel block.

Based on the texture patch corresponding to the identified class including more than one texture patch, the training network model may be configured to identify one of the more than one texture patch based on a correlation between the pixel block and each of the more than one texture patch.

The training network model may be configured to train the at least one texture patch based on at least one of a storage time of the at least one texture patch, and an application frequency of the at least one texture patch.

Based on the pixel block being determined to not correspond to one of the plurality of classes in accordance with a characteristic of the pixel block, the training network model may be configured to generate a new class based on the characteristic of the pixel block, and to map and store the pixel block to the new class.

The training network model may be configured to identify a class corresponding to each of a plurality of pixel blocks included in the input image, and to change a size of a storage space of the memory corresponding to at least one of the plurality of classes based on an identification frequency of each of the plurality of classes.

The training network model may be configured to remove, from the memory, a texture patch corresponding to a class identified less than a predetermined number of times based on the identification frequency, and to assign a storage space obtained as a result of the removal to other classes.

The plurality of classes may be classified based on at least one of an average pixel value, a pixel coordinate, a variance, an edge strength, an edge direction, or a color.

The at least one processor may be further configured to: obtain a weighted value for the texture patch based on a correlation between the texture patch and the pixel block, and obtain the output image by applying, to the pixel block, the texture patch to which the weighted value is applied.

The output image may be a 4K Ultra High Definition (UHD) image or an 8K UHD image.

In accordance with an aspect of the disclosure, there is provided an image processing method of an image processing apparatus, the method including: applying an input image to a training network model; and applying, to a pixel block included in the input image, a texture patch corresponding to the pixel block to obtain an output image, wherein the training network model stores a plurality of texture patches corresponding to a plurality of classes classified based on a characteristic of an image, and trains at least one texture patch, among the plurality of texture patches, based on the input image.

The training network model may identify a class, among the plurality of classes, based on a characteristic of the pixel block, obtain a texture patch corresponding to the identified class, compare a first similarity between the pixel block and the identified class with a second similarity between the texture patch and the identified class, and determine whether to update the texture patch based on the comparison.

The training network model may replace the texture patch corresponding to the identified class with the pixel block based on the comparison, or add the pixel block as another texture patch corresponding to the identified class.

Based on the first similarity being less than the second similarity according to the comparison, the training network model may maintain the texture patch corresponding to the identified class; and based on the first similarity being greater than the second similarity according to the comparison, the training network model may update the texture patch based on the pixel block.

Based on the texture patch corresponding to the identified class including more than one texture patch, the training network model may identify one of the more than one texture patch based on a correlation between the pixel block and each of the more than one texture patch.

The training network model may train the at least one texture patch based on at least one of a storage time of the at least one texture patch, and an application frequency of the at least one texture patch.

Based on the pixel block not corresponding to one of the plurality of classes in accordance with a characteristic of the pixel block, the training network model may generate a new class based on the characteristic of the pixel block, and may map and store the pixel block to the new class.

The plurality of classes may be classified based on at least one of an average pixel value, a pixel coordinate, a variance, an edge strength, an edge direction, or a color.

In accordance with an aspect of the disclosure, there is provided a non-transitory computer-readable recording medium having recorded thereon a program executable by a computer for performing the method.

In accordance with an aspect of the disclosure, there is provided an image processing method of an image processing apparatus, the method including: training a training network model based on an input image, the training network model storing a plurality of texture blocks corresponding to a plurality of classes classified based on an image characteristic; and obtaining an output image by applying, to a pixel block included in the input image, a texture patch corresponding to the pixel block, among a plurality of texture blocks stored in the training network model.

The training the training network model may include: identifying a class, among the plurality of classes, based on a characteristic of the pixel block; obtaining a texture patch corresponding to the identified class; comparing a first similarity between the pixel block and the identified class with a second similarity between the texture patch and the identified class; and determining whether to update the texture patch in the training network model based on the comparing.

The training the training network model may further include, based on determining to update the texture patch, replacing the texture patch corresponding to the identified class with the pixel block, or adding the pixel block as another texture patch corresponding to the identified class.

The determining whether to update the texture patch may include: based on the first similarity being less than the second similarity according to the comparing, maintaining the texture patch corresponding to the identified class in the training network model; and based on the first similarity being greater than the second similarity according to the comparing, updating the texture patch based on the pixel block.

The obtaining the texture patch corresponding to the identified class may include, based on the texture patch corresponding to the identified class including more than one texture patch, determining one of the more than one texture patch based on a correlation between the pixel block and each of the more than one texture patch.

The training the training network model may include training the training network model based on at least one of a storage time of at least one texture patch among the plurality of texture patches, and an application frequency of the at least one texture patch.

The training the training network model may include, based on the pixel block not corresponding to one of the plurality of classes in accordance with a characteristic of the pixel block, generating, in the training network model, a new class based on the characteristic of the pixel block, and mapping and storing the pixel block to the new class.

The plurality of classes may be classified based on at least one of an average pixel value, a pixel coordinate, a variance, an edge strength, an edge direction, or a color.

In accordance with an aspect of the disclosure, there is provided a non-transitory computer-readable recording medium having recorded thereon a program executable by a computer for performing the method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In this specification, terms such as "include" and "have/has" should be construed as designating that there exists such features (e.g., numbers, operations, elements, or components), and not to exclude the existence or possibility of adding one or more of other features.

In the disclosure, the expressions "A or B," "at least one of A and B," "at least one of A or B," "one or more of A and/or B," and the like include all possible combinations of the listed items.

Terms such as "first" and "second" may be used to modify various elements regardless of order and/or importance. Those terms are only used for the purpose of differentiating a component from other components.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element).

The singular expression also includes the plural meaning as long as it does not convey a different meaning in the corresponding context. In this specification, terms such as "include" and "have/has" should be construed as designating that there exist such features, numbers, operations, elements, components or a combination thereof in the specification, and not to exclude the existence or possibility of adding one or more of other features, numbers, operations, elements, components or a combination thereof.

In one or more embodiments, "a module," "a unit," or "a part" perform at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

In this specification, the term "user" refers to a person using an electronic apparatus or an apparatus using an electronic apparatus (e.g., an artificial intelligence electronic apparatus).

Hereinafter, one or more embodiments will be described in detail with reference to the accompanying drawings.

Figure 1:
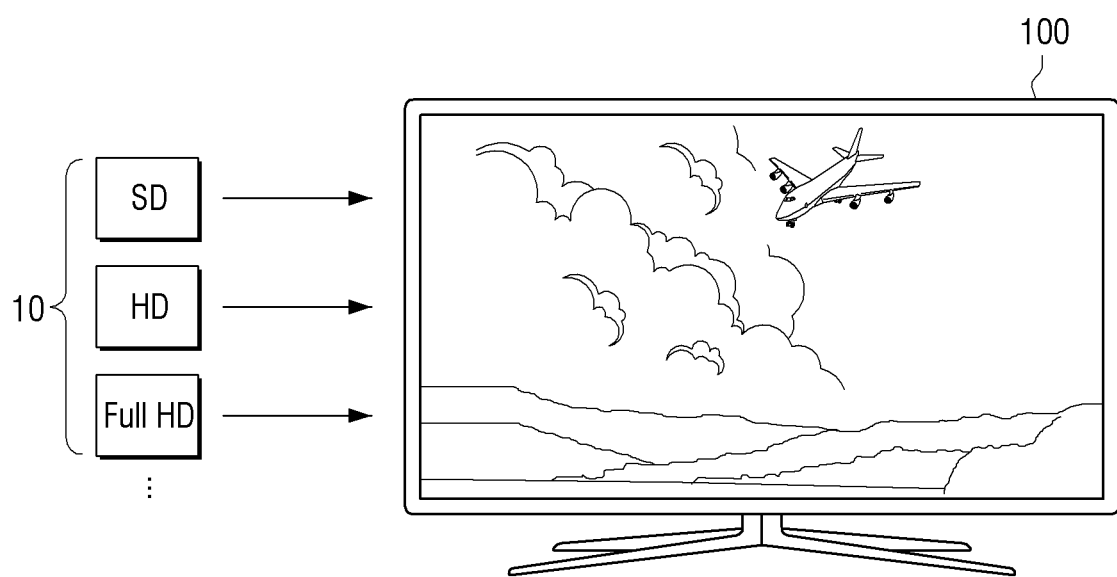
FIG. 1 is a view to explain an example embodiment of an image processing apparatus according to an embodiment.

FIG. 1 is a view to explain an example embodiment of an image processing apparatus 100 according to an embodiment.

Referring to FIG. 1, an image processing apparatus 100 may be embodied as a TV, but is not limited thereto. The image processing apparatus 100 may be embodied as any type of apparatus including a display function such as a smart phone, a tablet PC, a laptop, a head mounted display (HMD), a near eye display (NED), a large format display (LFD), a digital signage, a digital information display (DID), a video wall, a projector display, etc.

The image processing apparatus 100 may receive images of various resolutions or various compressed images. For example, the image processing apparatus 100 may receive a Standard Definition (SD) image, a High Definition (HD) image, a Full HD image, an Ultra HD image (e.g., 4K UHD, 8K UHD, etc.), or the like. The image processing apparatus 100 may receive an image in a compressed form such as MPEG (e.g., MP2, MP4, MP7, etc.), AVC, H.264, HEV C, etc.

According to an embodiment, even if the image processing apparatus 100 is embodied as a UHD TV, an SD image, an HD image, a Full HD image, etc. (hereinafter referred to as a low-resolution image), may be input because, for example, UHD contents are lacking. In this case, a method for expanding an input low-resolution image 10 into a UHD image or image of greater resolution (hereinafter referred to as high-resolution image) may be used. However, there is a problem in the related art that texture of an image is blurred and details are deteriorated in the process of expanding an image. The texture of the image refers to a unique pattern or shape of a region considered as the same feature of the image.

Further, even if a high-resolution image is input, loss of texture may occur due to image compression, so that details may not be ensured. A digital image may use more data as the number of pixels increases and, in the case of compression, loss of texture caused by compression is inevitable.

Therefore, various embodiments for restoring lost texture components and enhancing the details of an image will be described below with respect to various cases.

Figure 2:
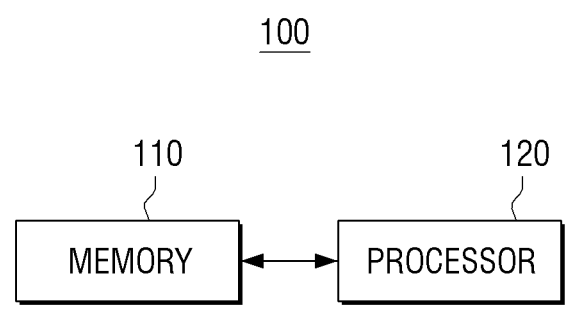
FIG. 2 is a block diagram to explain a configuration of an image processing apparatus according to an embodiment.

FIG. 2 is a block diagram to explain a configuration of an image processing apparatus 100 according to an embodiment.

Referring to FIG. 2, an image processing apparatus 100 may include a memory 110 and a processor 120.

The memory 110 may be electrically connected to the processor 120, and may store data used in various embodiments. For example, the memory 110 may be implemented as an internal memory such as a read-only memory (ROM) (for example, electrically erasable programmable read-only memory (EEPROM)), a random access memory (RAM), or a separate memory from the processor 120. In this case, the memory 110 may be implemented in the form of a memory embedded in the image processing apparatus 100, or a removable memory inserted in the image processing apparatus 100, depending on the purpose of data storage. For example, data for driving the image processing apparatus 100 may be stored in a memory embedded in the image processing apparatus 100, and data for an expansion function of the image processing apparatus 100 may be stored in a memory attachable to or detachable from the image processing apparatus 100. The memory embedded in the image processing apparatus 100 may be embodied with at least one of a volatile memory (e.g., dynamic RAM (DRAM), static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD)). The memory removable from the image processing apparatus 100 may be embodied by a memory card (e.g., a compact flash card, a secure digital (SD) card, a micro SD card, a mini SD card, an extreme digital (xD) card, or the like), an external memory connectable to a USB port (e.g., a USB memory), or the like.

The memory 110 may store a training network model used for obtaining a texture patch corresponding to a pixel block included in an input image 10. The training network model may be a machine learning model based on a plurality of images. For example, the training network model may be a model trained based on a Convolution Neural Network (CNN) based on a plurality of sample images and the input image 10. The CNN may be a multilayer neural network having a specific connection structure designed for voice processing, image processing, etc. Particularly, the CNN may filter an image in various ways by preprocessing a pixel, and recognize the characteristic of the image. For example, the CNN may recognize the characteristic of the pixel block of a predetermined size included in the input image 10. The training network model is not limited to the CNN. For example, the image processing apparatus 100 may use a training network model based on various neural networks such as a Recurrent Neural Network (RNN), a Deep Neural Network (DNN), etc.

Meanwhile, "texture patch" refers to a patch applied to the pixel block for improving the texture of a pixel block. The term "patch" may be a term applied in consideration of functions for sake of convenience, but various terms other than the term "patch" could be used in an embodiment. For example, each patch may have a structure in which a plurality of patch values are aligned in the form of a matrix of pixel units, and thus could be referred to as a mask. As the texture patch is applied to the pixel block, the texture of the pixel block may be improved, and details of the pixel block may improve. The image processing apparatus 100 may apply the updated texture patch using a training network model, as opposed to a texture patch fixed to the pixel block regardless of the characteristic of the pixel block.

The processor 120 may be electrically connected to the memory 110 and control the overall operations of the image processing apparatus 100.

According to an embodiment, the processor 120 may be implemented as a digital signal processor (DSP), a microprocessor, or a time controller (TCON), but is not limited thereto. The processor 120 may include one or more of a central processing unit (CPU), a microcontroller unit (MCU), a micro processing unit (MPU), a controller, an application processor (AP), a communication processor (CP), an ARM processor, and the like, or may be defined by the corresponding terms. The processor 120 may be implemented as a system on chip (SoC), a large scale integration (LSI) with a built-in processing algorithm, or in the form of a Field Programmable Gate Array (FPGA).

The processor 120 may obtain an output image by processing an input image. The processor 120 may obtain an output image by performing a texture enhancement process on the input image. The output image may be an Ultra High Definition (UHD) image, specifically, a 4K UHD image or an 8K UHD image, but is not limited thereto.

The processor 120 according to an embodiment may obtain a texture patch used for texture enhancement processing. The processor 120 may obtain a texture patch corresponding to the pixel block included in the input image 10 by applying the input image 10 to the training network model. The pixel block refers to a group of adjacent pixels including at least one pixel.

Figure 3:
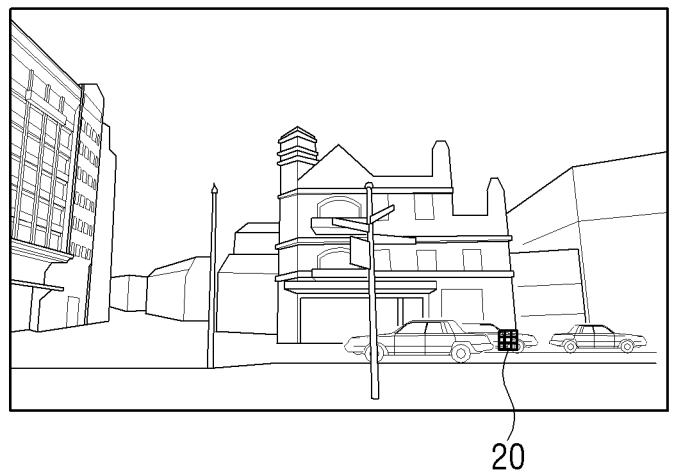
FIG. 3 is a view to explain a pixel block according to an embodiment.

FIG. 3 is a view to explain a pixel block 20 according to an embodiment.

Referring to FIG. 3, the processor 120 may divide a plurality of pixels of an image frame constituting the input image 10 in a unit of a pixel block 20 and input the plurality of pixels to the training network model. According to an embodiment, the processor 120 may sequentially input a plurality of pixel blocks 20 constituting the image frame to the training network model. The training network model may output texture patches 30-1, . . . , and 30-n respectively corresponding to a plurality of pixel blocks 20-1, . . . and 20-n (see FIG. 5).

The processor 120 may divide or identify the input image 10 as 5×5 pixel blocks 20, but the size of the pixel block is not limited thereto. The size of the pixel block may be embodied in various sizes of N×N such as 3×3, 4×4, etc., or of M×N. The processor 120 may divide or identify the input image 10 as the pixel block 20 of various sizes according to at least one of the resolution of the input image (e.g., FHD), the resolution of the output image (UHD and 8K), etc. Hereinafter, for ease of explanation, a pixel group of a predetermined size in which pixel blocks 20 are arranged in a matrix format in an image frame constituting the input image 10 will be referred to as the pixel block 20 obtained from the input image 10.

Referring to FIG. 2, the processor 120 may obtain the texture patch corresponding to the pixel block 20 by applying the input image 10 to the training network model. A detailed description thereof will now be made with reference to FIG. 4.

Figure 4:
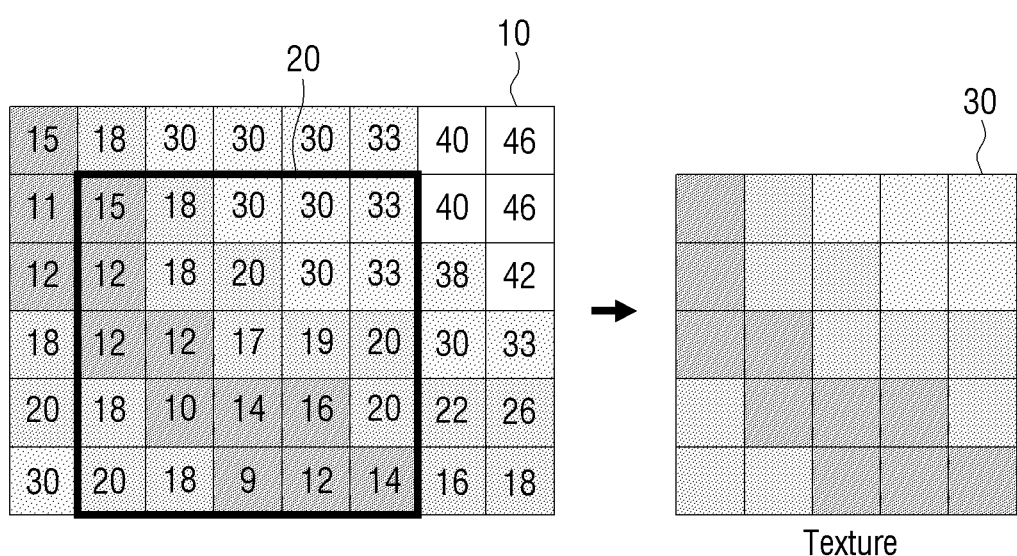
FIG. 4 is a view to explain a texture patch according to an embodiment.

FIG. 4 is a view to explain a texture patch 30 according to an embodiment.

FIG. 4 is a view illustrating each of pixels constituting the input image 10 as a pixel value. The processor 120 may obtain a texture patch 30 corresponding to the pixel block 20 by applying the input image 10 to the training network model. The applying refers to inputting the input image 10 to the training network model, and the output of the training network model may be the texture patch 30.

The training network model may output the texture patch 30 corresponding to the pixel block 20 included in the input image 10, and perform training based on the pixel block 20.

The training network model may include a plurality of classes classified based on any one of various characteristics of an image, and include the texture patch 30 corresponding to each of the classes. For example, the training network model may store the plurality of classified classes based on an edge direction among the characteristics of an image, and include the texture patch 30 corresponding to each of the plurality of classes. By way of another example, the training network model may store a plurality of classes classified based on a grayscale average value in the unit of the pixel block 20 among the characteristics of the image, and include the texture patch 30 corresponding to each of the classes.

The image processing apparatus 100 may include a plurality of training network models. The image processing apparatus 100 may include a plurality of training network models such as a first training network model for dividing classes based on the edge direction and performing training on the texture patch 30, a second training network model for dividing classes based on the grayscale average value and performing training, a third training network model for dividing classes based on a color coordinate and performing training, etc. The image processing apparatus 100 may identify any one of the plurality of training network models based on the characteristic of the input image 10, and apply the identified training network model to the input image 10 to obtain the texture patch 30. For example, the image processing apparatus 100 may include a pre-processing training network model for identifying any one of the plurality of training network models to obtain the appropriate texture patch 30 based on the characteristic of the input image 10. The pre-processing training network model may identify the first training network model for dividing the classes based on the edge direction and outputting the texture patch 30 based on the characteristic of the image, for example, if the colors of the plurality of pixels constituting the input image 10 are distributed in the similar color range.

The training network model may perform training based on the input image 10. For example, the training network model may identity the first similarity of the pixel block 20 for the class corresponding to the pixel block 20 included in the input image 10, and the second similarity of the obtained texture patch 30 matched with the class for the class. In this case, for example, if the first similarity is greater than the second similarity, the training network model may determine that the obtained texture patch 30 is not appropriate for the texture improvement of the input image 10, and perform updating based on the pixel block 20 of the input image 10.

When outputting the texture patch 30 corresponding to another pixel block 20' included in the same class as the pixel block 20 among various pixel blocks constituting the input image 10, the training network model may output a texture patch 30' updated based on the pixel block 20, as opposed to the texture patch 30 before updating. Accordingly, the texture patch 30 output from the training network model may be appropriate for texture enhancement of the input image 10. Furthermore, if the second similarity is greater than the first similarity, the training network model may determine that the obtained texture patch 30 is appropriate for the texture enhancement of the input image 10 and maintain the texture patch 30.

The operation of the training network model for classifying (or identifying) the class corresponding to the pixel block 20, among a plurality of classes, may be referred to as a classifier, a class identifier, etc. The classifier may identify a class appropriate for the pixel block 20 among the plurality of classes if the pixel block 20 included in the input image 10 is input. For example, the classifier may identify the edge direction of the pixel block 20, and identify the similarity between the identified edge direction and an edge direction for defining each of the plurality of classes. The classifier may identify a class having the largest similarity among the plurality of classes as the class corresponding to the pixel block 20.

The training network model may be defined by the combination of a model for identifying the class corresponding to the pixel block 20 (e.g., a classifier model) and a model for comparing the similarities of the pixel block 20 and the texture patch 30 corresponding to the pixel block 20 and performing self-learning on the texture patch 30. The training network model may be an On-device Machine Learning Model in which the image processing apparatus 100 trains itself without depending on an external device. However, this is only an example, and it is understood that one or more other embodiments are not limited thereto. For example, according to another embodiment, the training network model could be embodied such that the classifier model may operate on the device, i.e., in the image processing apparatus 100, and the model for performing training on the texture patch may operate based on an external device or server.

Accordingly, the training network model may store the texture patch 30 corresponding to each of the plurality of classes classified and trained based on the characteristic of the image. The training network model may train the texture patch 30 corresponding to each of the plurality of classes based on the pixel value included in the input image 10 at the time of outputting the texture patch corresponding to the input image 10.

Referring to FIG. 4, the training network model may identify a single class corresponding to the pixel block 20 among a plurality of classes based on the characteristic of the pixel block 20. For example, the training network model may store a plurality of classes classified based on the edge direction (or, the edge pattern) among various characteristics of the image. The edge refers to a point where a pixel value (or, a pixel brightness) changes from a low value to a high value, or from a high value to a low value. Thus, the edge refers to a border between objects generated according to various objects included in the image. The training network model may identify a single class corresponding to the edge direction (or, the direction of the border) of the pixel block 20 among the plurality of classes. The training network model may identify a signal class most similar to (or most appropriate to) the edge direction of the pixel block 20 among the plurality of classes. The training network model may output the texture patch 30 corresponding to the identified class. Referring to FIG. 2, the processor 120 may perform texture enhancement processing by applying the texture patch output from the training network model to the input image 10.

Figure 5:
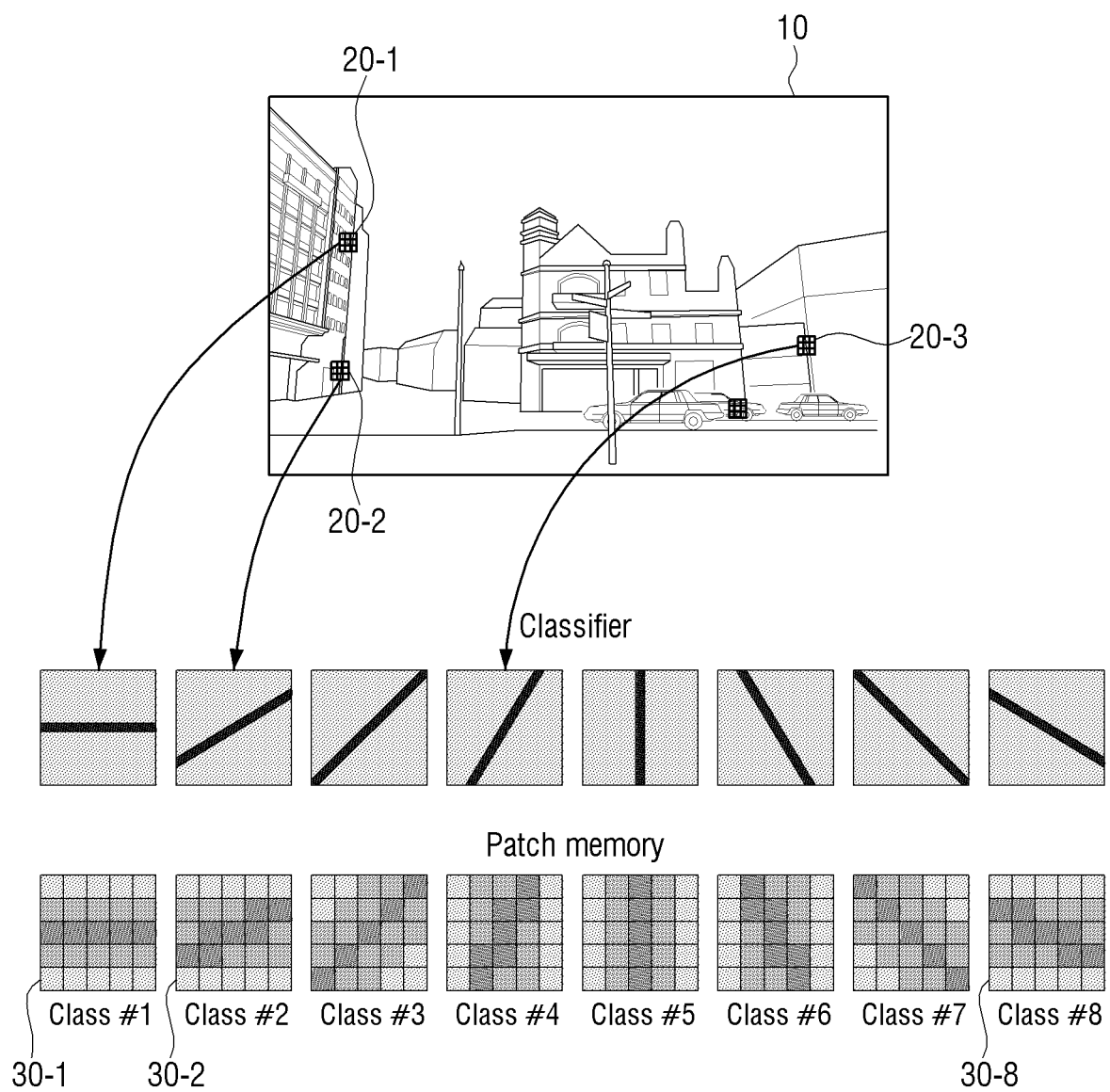
FIG. 5 is a view to explain a training network model according to an embodiment.

FIG. 5 is a view to explain a training network model according to an embodiment.

As described above, the training network model may store a plurality of classes classified based on the characteristic(s) of the image, and at least one texture patch 30-1, 30-2, . . . 30-8 corresponding to each of the plurality of classes. Referring to FIG. 5, the training network model may include first to nth classes classified based on the edge direction among the characteristics of the image. The training network model may include a texture patch 30-1, 30-2, . . . 30-8 corresponding to each of the first to nth classes. The characteristic(s) of the image may include at least one of average, variance, pixel coordinate, edge strength, edge direction, color, etc., of pixel values included in the pixel block 20. The training network model according to an embodiment may include a plurality of classes classified based on at least one of average, variance, pixel coordinate, edge strength, edge direction, color, etc., of pixel values. Apart from the above-described examples, the training network model may generate a plurality of classes based on the various characteristic identified from the pixel block 20, and identify which of the plurality of classes the pixel bock 20 corresponds to. For example, the training network model may classify the classes based on the color coordinate, and identify the class corresponding to the pixel block 20 based on the average of color coordinates of pixels included in the pixel block 20.

Referring to FIG. 5, the processor 120 may classify a plurality of pixels included in an image frame constituting the input image 10 in units of the pixel block 20 and input the plurality of pixels, i.e., pixel blocks 20-1, . . . and 20-n, into the training network model. The processor 120 may input the plurality of pixel blocks 20-1, . . . and 20-n constituting the image frame into the training network model sequentially. The training network model may output texture patches 30-1, . . . and 30-n respectively corresponding to the plurality of pixel blocks 20-1, . . . and 20-n.

For example, the training network model may identify the class corresponding to the first pixel block 20-1 among the plurality of classes based on the characteristic of the first pixel block 20-1. In this case, the training network model may identify the edge direction of the first pixel block 20-1 based on the pixels constituting the first pixel block 20-1, and identify which of the plurality of classes the identified edge direction corresponds to. The training network model may identify the similarity between the plurality of classes and the first pixel block 20-1. For example, if the edge direction of the first pixel block 20-1 is 0°, the training network model may obtain a high similarity (or, fitness) in the first class (Class #1) as compared to the second to eighth classes (Class #2-Class #8). The first class (Class #1) may refer to the class defined based on the edge direction of 0°. The training network model may therefore identify the first class (Class #1) as the class corresponding to the first pixel block 20-1. The processor 120 may obtain the first texture patch 30-1 corresponding to the first class (Class #1) through the training network model.

By way of another example, if the second pixel block 20-2 is identified to correspond to the second class (Class #2) among the plurality of classes, the training network model may provide the second texture patch 30-2 corresponding to the second class (Class #2).

For ease of explanation, FIG. 5 illustrates that the training network model includes the first to eighth classes based on the edge direction, and each of the classes includes a single texture patch, that is, the first to eighth texture patches 30-1, . . . and 30-8. However, it is understood that this is just an example, and one or more other embodiments are not limited thereto.

Meanwhile, if a pixel block 20 is identified as not corresponding to any one of the plurality of classes based on the characteristic of the pixel block 20, the training network model may generate a new class based on the characteristic(s) of the pixel block 20, and map and store the pixel block 20 in a new class. For example, if the similarity between the pixel block 20 and the plurality of classes is less than a threshold value, the training network model may generate a new class other than the plurality of classes based on the characteristic of the pixel block 20.

Referring to FIG. 5, according to an embodiment, if the similarity between the first to eighth classes and the fourth pixel block 20-4 is a threshold value or less (or less than a threshold value), that is, there is no class identified as corresponding to the fourth pixel block 20-4, the training network model may generate a ninth class based on the characteristic of the fourth pixel block 20-4. For example, if the plurality of classes are classified based on the edge direction, the training network model may identify the edge direction of the pixels constituting the fourth pixel block 20-4 and generate the ninth class based on the identified edge direction. The training network model may map the fourth pixel block 20-4 to the ninth class and store the fourth pixel block 20-4. For example, the training network model may store the fourth pixel block 20-4 as the texture patch corresponding to the newly-generated ninth class.

If the texture patch 30 matched with the class corresponding to the pixel block 20 is identified, the training network model may identify whether the texture patch 30 has been updated based on the similarity between the pixel block 20 and the class, and the similarity between the texture patch 30 and the class. The training network model may identify whether updating has been performed by comparing the similarity (or fitness) between the reference for defining a class and the pixel block 20 with the similarity between the reference for defining a class and the texture patch 30 matched with the class. Referring to FIG. 5, the training network model may include a plurality of classes classified based on the edge direction, as described above. The first class (Class #1) among the plurality of classes may be a class of which edge direction is defined by 0°, and the fifth class (Class #5) may be a class of which edge direction is defined by 90°. If the first pixel block 20-1 is input, the training network model may identify the first class (Class #1) having the largest similarity among the plurality of classes based on the edge direction of the first pixel block 20-1. Whether the first texture patch 30-1 has been updated may be identified by comparing the similarity between the first class (Class #1) and the first pixel block 20-1 with the similarity between the first class (Class #1) and the first texture patch 30-1.

A detailed description of the updating will now be made with reference to FIG. 6.

Figure 6:
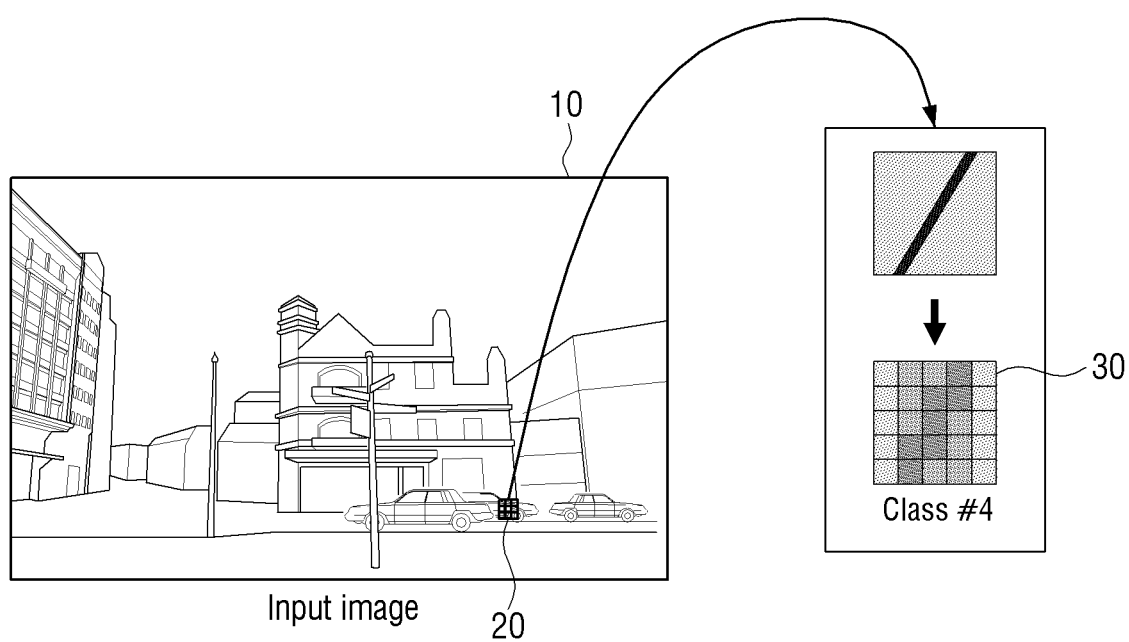
FIG. 6 is a view to explain a class and a texture patch according to an embodiment.

FIG. 6 is a view to explain a class and a texture patch 30 according to an embodiment.

Referring to FIG. 6, the training network model may identify the class corresponding to the pixel block 20 among the plurality of classes based on a characteristic of the pixel block 20. For example, if the pixel block 20 includes the edge direction of 65°, the training network model may identify the fourth class (Class #4) defined by the edge direction of 67.5° from among the first to eighth classes (Class #1 to Class #8). The training network model may obtain the texture patch 30 corresponding to the identified fourth class (Class #4).

The training network model may identify whether the texture patch 30 has been updated based on the similarity between the pixel block 20 and the fourth class (Class #4), and the similarity between the texture patch 30 and the fourth class (Class #4). The similarity may be measured, determined, or obtained using various types of similarity measurement algorithms, fitness measurement algorithms, and machine learning algorithms. For example, the degree of similarity may be identified by comparing histograms based on at least one of a grayscale value, calculating a Euclidean distance, etc. The degree of similarity may additionally or alternatively be identified based on a Convolution Neural Network (CNN) trained algorithm as another example.

For example, when the edge direction of the texture patch 30 matched with the fourth class (Class #4) according to the another (e.g., previous) input image, a sample image, etc., of the training network model is 50°, the edge direction for defining the fourth class (Class #4) may be 67.5°. Therefore, the training network model may identify that the first similarity of the pixel block 20 of which edge direction is 65° may be larger than the second similarity of the texture patch 30 of which edge direction is 50°, and the pixel block 20 is appropriate for the fourth class (Class #4). The training network model may substitute for or update the texture patch 30 based on the pixel block 20. If another pixel block included in the input image 10 is input, and the other pixel block corresponds to the fourth class (Class #4), the training network model may output the texture patch updated based on the pixel block 20 of which edge direction is 65°. The processor 120 may generate the texture of the other pixel block based on the updated texture patch.

By way of another example, when the second similarity between the class and the texture patch 30 matched with the class is larger than the first similarity between the class corresponding to the pixel block and the pixel block 20, the training network model may identify that the texture patch 30 is appropriate for texture generation of the input image 10 and the pixel block 20, and maintain the texture patch 30 as it is.

The training network model may update the texture patch 30 in the process of obtaining the texture patch 30 corresponding to the pixel block 20 included in the input image 10, and generate an image processing model including the texture patch 30 appropriate for texture enhancement of the input image 10.

For example, when the training network model is applied to the input image 10 including objects such as a forest, a lawn, etc., the training network model may compare the similarity between the pixel block 20 constituting the input image 10 and the class with the similarity between the pre-stored texture patch 30 and the class to maintain the pre-stored texture patch 30 or replace (or update) the pre-stored texture patch 30 with the pixel block 20. According to an embodiment, when the training network model is applied to another pixel block included in the input image 10, the training network model may identify the texture patch updated based on the pixel block 20 in a precedent process. In this case, the updated texture patch may be obtained from the input image 10, and have a high correlation and a high fitness with another pixel block included in the same input image 10. Therefore, the processor 120 may obtain an output image with improved texture and details by applying the updated texture patch to the other pixel block.

The training network model according to an embodiment may train the texture patch 30 based on at least one of the storage time or the application frequency of the texture patch 30 corresponding to each of the plurality of classes.

That is, according to an embodiment, the training network model may train the texture patch 30 based on the input image 10, and also consider when the pre-stored texture patch 30 is stored. For example, if is it identified or determined that the storage time of the texture patch 30 corresponding to the pixel block 20 included in the input image 10 elapses a predetermined time (e.g., precedes a predetermined time period), the training network model may replace the texture patch 30 with the pixel block 20. When the storage time of the texture patch 30 is long, the fitness with or suitability for the input image 10 and the similarity with the class in a matching relationship may be low. Therefore, the training network model may perform training based on the pixel block 20 included in the input image 10 and update the texture patch 30. The training network model may map the pixel block 20 included in the input image 10 to the texture patch 30 of the class corresponding to the pixel block 20, and use the newly mapped texture patch 30 to generate the texture of the input image 10.

By way of another example, if the similarity between the pixel block 20 and the class is the same as the second similarity between the texture patch 30 and the class, the training network model may update the texture patch 30 based on the storage time, the application frequency, etc., of the texture patch 30. For example, when the first similarity and the second similarity are the same, the pixel block 20 may be more appropriate for the texture generation of the input image 10 rather than the pre-stored texture patch 30, and the texture patch 30 may be updated based on the pixel block 20. Alternatively, based on the first similarity and the second similarity being the same, the training network model may add the pixel block 20 in addition to the texture patch 30.

However, these are only examples, and one or more other embodiments may not update the texture patch 30 when the storage time of the texture patch 30 passes a predetermined time.

Furthermore, according to an embodiment, the training network model may train the texture patch 30 based on the application frequency of the texture patch 30. For example, when a specific texture patch 30 is identified to be used frequently for generating the texture of another input image (or other input images, e.g., previous input images) other than the currently input image 10, the specific texture patch 30 may have a high fitness with or suitability for the class, and is usefully applicable to the texture generation. However, if it is identified that the specific texture patch 30 is used for texture generation less frequently, the training network model may identify or determine (or it may be understood) that the texture patch 30 has a lower fitness with or suitability for the class in a mapping relationship. In this case, the training network model may replace the texture patch 30 with the pixel block 20 included in the input image 10.

As described above, in one or more embodiments, if a specific class of the plurality of classes is identified to be a class corresponding to the pixel block 20 based on a characteristic of the pixel block 20, and if the storage time of the texture patch 30 corresponding to the identified class passes a predetermined time and/or the application frequency of the texture patch 30 is less than a threshold (e.g., a threshold number of times), the training network model may replace the texture patch 30 with the pixel block 20.

Figure 7:
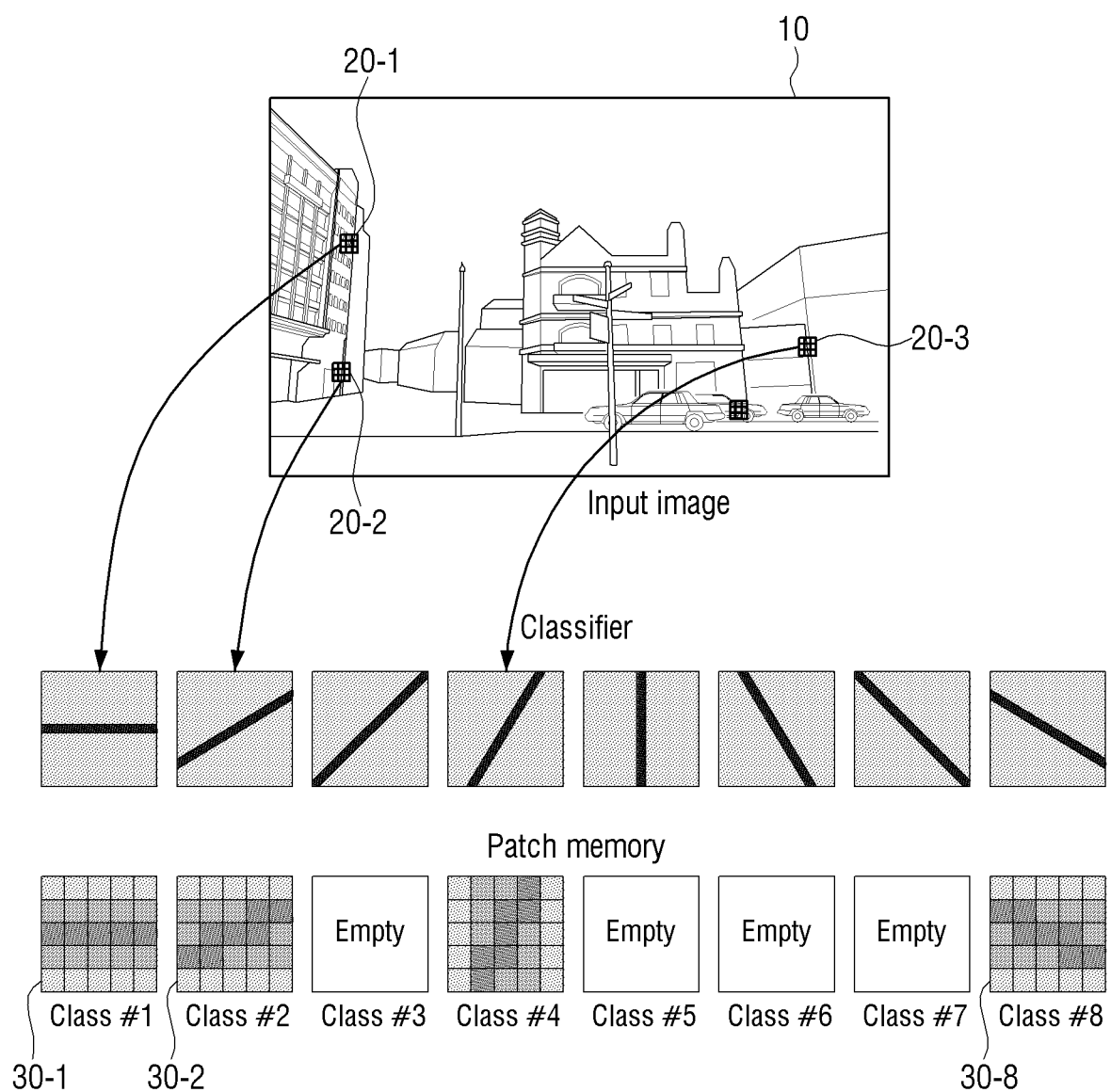
FIG. 7 is a view to explain a model for training an input image according to an embodiment.

FIG. 7 is a view to explain a model for training an input image 10 according to an embodiment.

Referring to FIG. 7, the training network model may not store one or more texture patches 30 corresponding to part of the plurality of classes. For example, the training network model may not store all of the first to eighth texture patches 30-1, . . . , and 30-8 of FIG. 5 respectively corresponding to the first to eighth classes, but may only store texture patches 30-1, 30-2, . . . 30-8 for some of the plurality of classes a mapping relationship, while the remainder of the classes may not have corresponding texture patches stored and mapped thereto. In this case, the training network model may obtain and store the texture patch 30 based on the input image 10. For example, when the training network model identifies the class corresponding to the pixel block 20 included in the input image 10, and does not include a texture patch 30 corresponding to the identified class, the training network model may map and store the pixel block 20 to the identified class.

Meanwhile, it has been described above that the class includes only a single texture patch 30 mapped thereto, but it is understood that one or more other embodiments are not limited thereto. For example, the first class may include at least two texture patches 30 corresponding to the first class stored and mapped thereto. According to an embodiment, the training network model may identify the class of the pixel block 20 included in the input image 10, and add the pixel block 20 to the identified class as the texture patch 30. In this case, the training network model may not delete or replace the pre-stored texture patch 30, but may set the pre-stored texture patch 30 as the first texture patch, and the pixel block 20 as the second texture patch, and map and store the first texture patch and the second texture patch to the corresponding class.

Based on the texture patch 30 identified as corresponding to the pixel block 20 including a plurality of texture patches 30, the training network model may identify one of the plurality of texture patches 30 based on a correlation between the pixel block 20 and each of the plurality of texture patches 30. For example, when the class corresponding to the pixel block 20 is the fourth class, and the texture patch 30 in a mapping relationship with the fourth class includes first to third texture patches 30, the training network model may identify or determine the correlation between the pixel block 20 and each of the first to third texture patches 30, and identify a texture patch 30 having the largest correlation value among the identified correlations. The texture patch 30 having the largest correlation value refers to a patch having the highest fitness or suitability for the texture generation of the pixel block 20. The training network model may generate a texture by applying the identified texture patch 30 to the pixel block 20.

Figure 8:
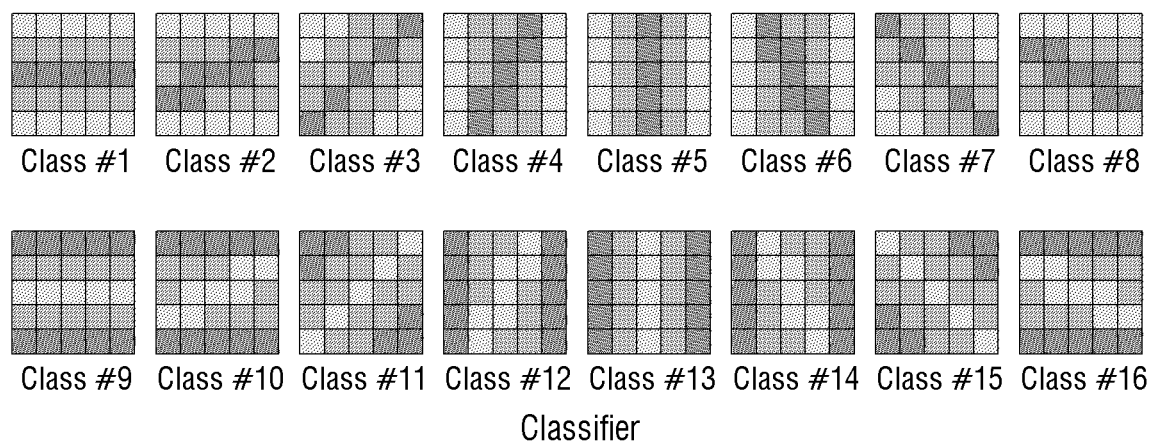
FIG. 8 is a view to explain a class according to another embodiment.

FIG. 8 is a view to explain a class according to another embodiment.

Referring to FIG. 8, the training network model may identify the pixel block 20 as one of first to sixteenth classes based on one or more characteristics of the image. The training network model may identify the texture patch 30 in a mapping relationship with the classified class. The identified texture patch 30 may be applied to the pixel block 20.

The training network model may distinguish classes based on various references. The number of classes may not be fixed or limited, but the training network model may delete a particular class among a plurality of classes, or generate an additional class other than the plurality of classes.

For ease of explanation, it has been described that the classes are classified based on the edge direction, but it is understood that one or more other embodiments are not limited thereto. For example, the training network model may classify the first to nth classes based on the distribution of a color coordinate, and identify the corresponding class among the first to nth classes based on the color coordinate distribution of the pixel block 20 included in the input image 10. For another example, the training network model may classify the first to nth classes based on an average grayscale value, a distribution of the grayscale value, etc.

Figure 9:
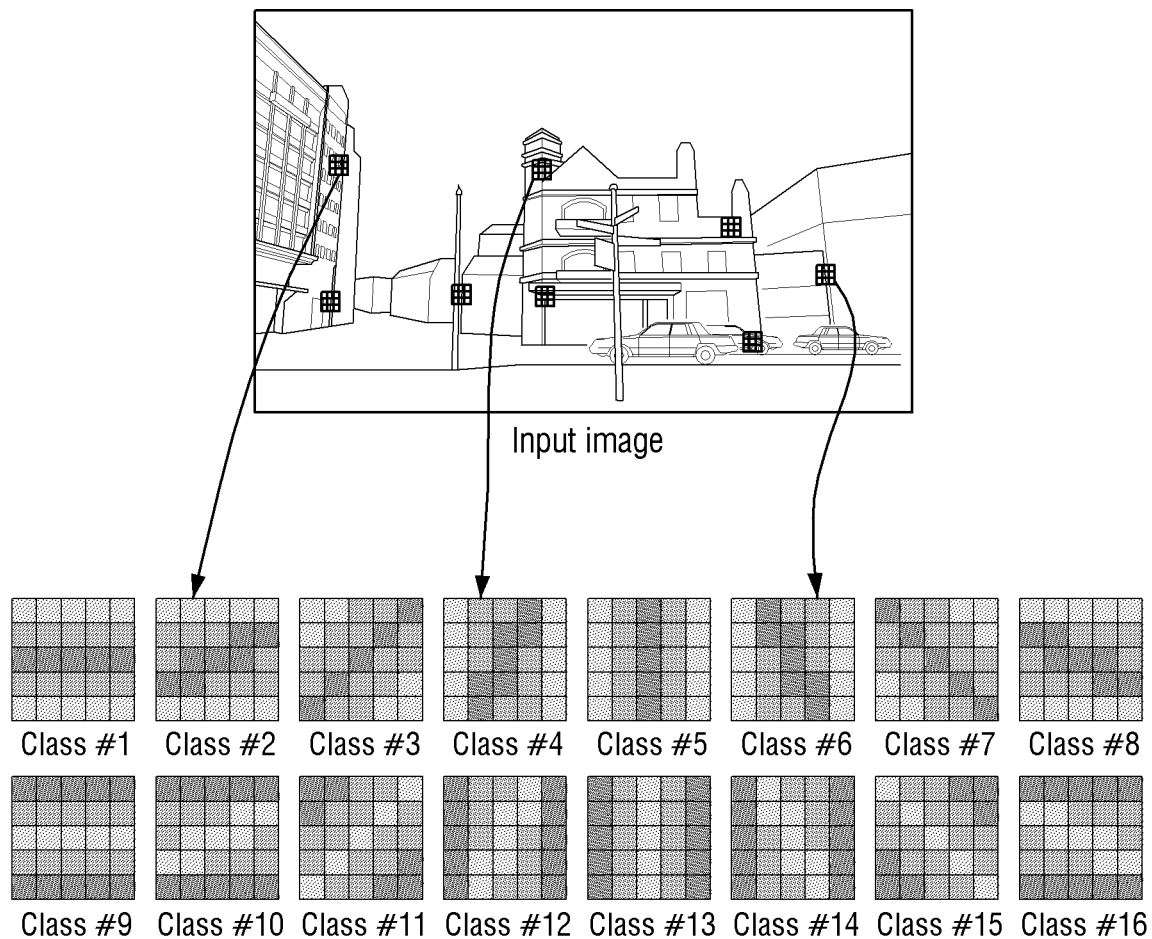
FIG. 9 is a view to explain a training result according to an embodiment.

FIG. 9 is a view to explain a training result according to an embodiment.

Referring to FIG. 9, the training network model may provide the texture patch 30 corresponding to each of the plurality of pixel blocks 20 constituting the input image 10, and the processor 120 may obtain the output image with improved details by applying the texture patch 30 to the pixel block 20.

As the training network model performs training based on the pixel block 20 included in the input image 10, the plurality of classes and the texture patch 30 included in the training network model before and after the input of the image 10 may be different. For example, the training network model before the input of the image may include the texture patch 30 trained based on another image previously input or a sample image. The training network model may identify or determine the similarity between the pixel block 20 included in the input image 10 and the class corresponding to the pixel block 20, and the similarity between the texture patch 30 mapped with the class and the class, and update the texture patch 30 based on the identification result. For example, the training network model may replace the texture patch 30 with the pixel block 20, or maintain the texture patch 30.

Referring to FIG. 9, texture patches 30 corresponding to part or some of the plurality of classes included in the training network model may be replaced by pixel blocks 20 included in the input image 10 and corresponding to those classes. Meanwhile, the remainder of the plurality of classes may maintain the texture patches 30 in a mapping relationship.

FIGS. 5, 6, and 7 illustrate the class corresponding to the pixel block 20 indicated by an arrow, and FIG. 9 illustrates that the texture patch 30 is replaced by the pixel block 20 according to the training result of the training network model indicated by arrow. For example, referring to FIG. 9, the texture patches 30 corresponding to each of classes 2, 4, and 6 may be replaced by pixel blocks 20 included in the input image 10.

According to an embodiment, the processor 120 may obtain a weighted value for a texture patch 30 based on a relationship between the texture patch 30 and the pixel block 20. The processor 120 may obtain an output image by applying, to the pixel block 20, a texture patch 30 to which the weighted value is applied.

A correlation (or association) between the pixel block 20 included in the input image 10 and the texture patch 30 obtained from the training network model may be calculated to a value (e.g., a predetermined value). The degree of the relevance may be expressed by a value referred to as a correlation coefficient. For example, the correlation coefficient may be expressed by a value between −1.0 and +1.0, and the greater the absolute value of the number regardless of sign, the greater the relevance. For example, a negative value may indicate a negative correlation, and a positive value may indicate a positive correlation.

For example, value C [n] may be obtained as E [I*R [n]]=ii*ri, where the pixel value I=[i0, i1, ..., in-1] included in the pixel block 20, and the value R[n]=[r0, r1, ..., rn-1] included in the texture patch R[n].

The correlation value may be obtained based on Equation 1 below, where the average of the pixel values included in the target pixel block is m(I), and the average of the values included in the texture patch R[n] is m(R[n]).

$$C[n]=E[(I-m(I))(R[n]-mR[n])]$$ [Equation 1]

According to another embodiment, the average of the texture patch 30 may be 0. When the average value is 0, the brightness of the entire input image 10 may be maintained although the texture patch 30 is applied. According to an embodiment, when the average of the texture patch 30 is 0, Equation 2 is expressed as below based on Equation 1.

$$C[n]=E[I*R[n]]-E[I*m(R[n])]=E[I*R[n]]$$ [Equation 2]

Based on the correlation between the pixel block 20 and the texture patch 30 corresponding to the pixel block 20 being a threshold value or more (or greater than the threshold value), the training network model may maintain the texture patch 30 corresponding to the class of the pixel block 20. Further, based on the correlation between the pixel block 20 and the texture patch 30 corresponding to the pixel block 20 being a threshold value or less (or less than a threshold value), the training network model may update the texture patch 30 based on the pixel block 20. The processor 120 may obtain the value obtained by multiplying the obtained correlation value by a predetermined proportional constant as the weighted value corresponding to the texture patch 30. For example, the processor 120 may obtain the weighted value between 0 and 1 based on the correlation value. When the weighted value 0 is applied to the texture patch 30 according to a correlation, the texture patch 30 may not be added to the target pixel block 20. For example, a correlation between all the classes and all the texture patches may likely be low in a flat area or a sharp-edged area, and thus no texture may occur. In this case, a ringing phenomenon that could occur in an edge area may be prevented, and the unnecessary texture may be prevented from being added to a flat area.

According to another embodiment, the similarity information between the pixel block 20 and the texture patch 30 may be obtained by various cost functions other than the above-described correlation. For example, Mean Square Error (MSE), Sum of Absolute Difference (SAD), Median Absolute Deviation (MAD), and correlation may be used as a cost function for determining similarity. For example, when the MSE is applied, the MSE of the target pixel block may be calculated and the similarity between the target pixel block 20 and the texture patch 30 may be obtained from the MSE viewpoint. In this case, the similarity weights may be determined based on the MSE difference.

The processor 120 may apply the obtained weights to the texture patches 30, respectively, and obtain the output image by applying the texture patches 30 to which the weights are applied to the pixel blocks 20. The applying may refer to a method of adding a value included in the area corresponding to the texture patch to which the weight is applied to each pixel block value include in the target pixel block 20. However, it is understood that one or more other embodiments are not limited thereto, and additional or other processing other than addition may be performed.

According to another embodiment, when the texture patch 30 is obtained, the processor 120 may apply a frequency filtering to the texture patch 30, or apply, to the target pixel block, the texture patch 30 to which the frequency filtering is applied. The processor 120 may apply a frequency filtering before adding the texture patch 30 to the input image, and change the frequency range of the texture patch 30. For example, the processor 120 may generate a high-frequency texture by using a high-pass filter, or generate a low-frequency texture using a low-pass filter. Equation 3 expresses a process of obtaining an output image (O) by adding the filtered texture (Filter (T)) to the input image I.

$$O=I+\text{Filter}(T)$$ [Equation 3]

For example, the processor 120 may apply a low-pass filter such as a Gaussian blurring (or Gaussian filtering) to the texture patch 30. The Gaussian blurring may be a method for blurring using a Gaussian filter based on Gaussian possibility distribution, and if the Gaussian filter is applied to the texture patch 30, a high-frequency component may be blocked and blurring may be performed. The processor 120 may perform Gaussian filtering on all pixel values included in the texture patch 30, and obtain the blurred texture patch 30'. The processor 120 may obtain an output image by applying the blurred texture patch 30' to the pixel block 20.

Meanwhile, the above-described image processing, that is, texture enhancement processing, may be performed before or after scaling of the image. For example, the image processing may be performed after scaling for enlarging a low-resolution image to a high-resolution image, or the scaling may be performed after performing image processing in the process of decoding the input image.

The training network model according to another embodiment may obtain a plurality of texture patches corresponding to a class and to which different weighted values are applied.

For example, the training network model may identify the class corresponding to a pixel block 20, and obtain first to nth texture patches corresponding to the class. The training network model may identify the correlation between the pixel block 20 and each of the first to nth texture patches. For example, the training network model may obtain a first weighted value based on the correlation between the pixel block 20 and the first texture patch, and a second weighted value based on the correlation between the pixel block 20 and the second texture patch. The training network model may multiply the first weighted value by the first texture patch, and the second weighted value by the second texture patch, and apply, to the pixel block 20, the first texture patch to which the first weighted value is multiplied and the second texture patch to which the second weighted value is multiplied to obtain an output image.

According to an embodiment, the weighted value may be determined in a predetermined range, for example, between 0 and 1 according to the correlation. For example, the training network model may determine the weighted value as 0 when the correlation between the pixel block 20 and the obtained texture patch 30 is minimum, may determine the weighed value as 1 when the correlation is maximum, and may determine the weighted value so that the correlation may linearly increase between the minimum value and the maximum value.

Figure 10:
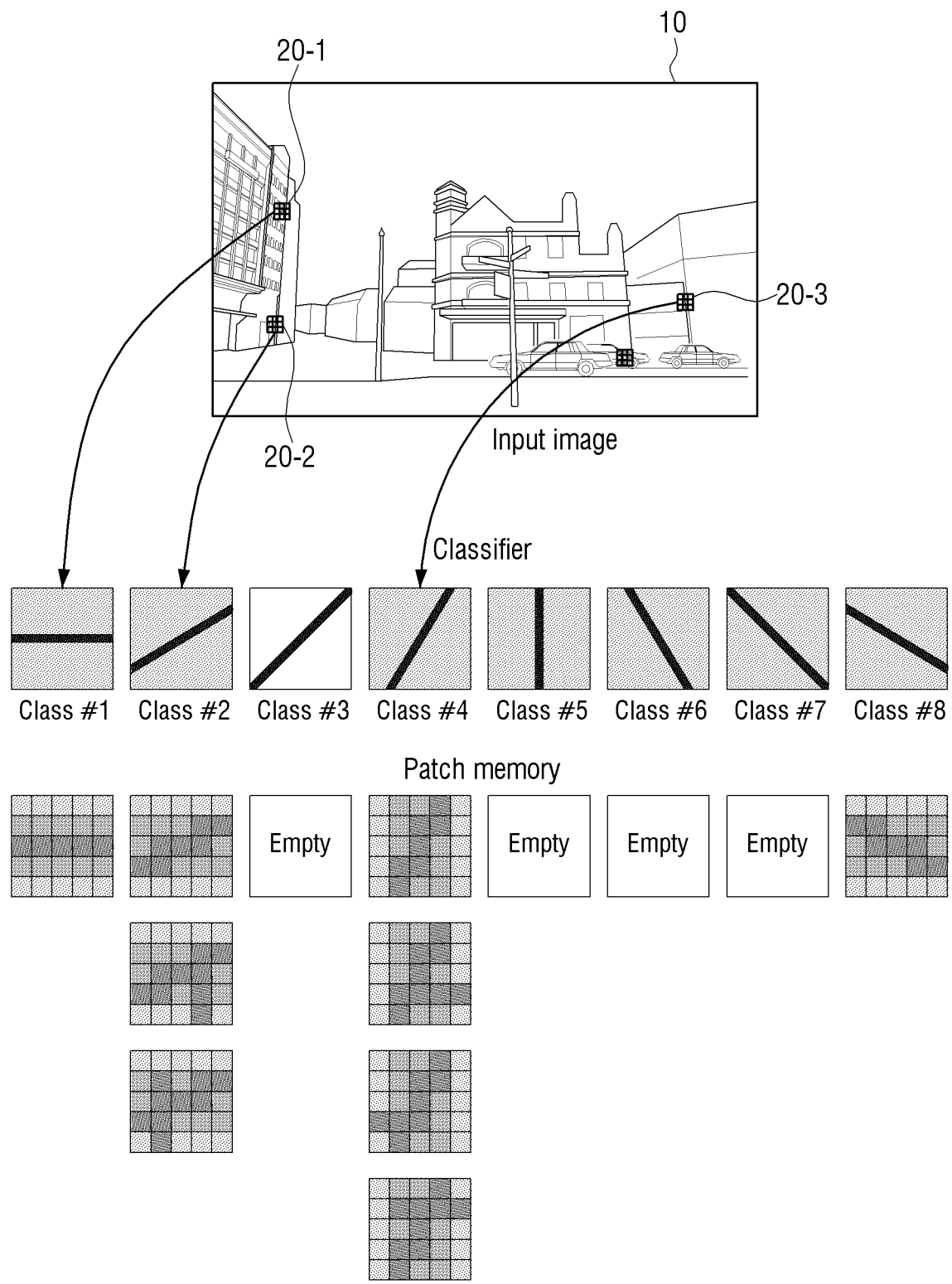
FIG. 10 is a view to explain a class according to another embodiment.

FIG. 10 is a view to explain a class according to another embodiment.

Referring to FIG. 10, a training network model may add or remove a texture patch 30 for each class in the process of performing training.

According to an embodiment, the training network model may remove (e.g., physically or logically from memory) the texture included in a specific class, or store a plurality of texture patches in the specific class to perform training based on a plurality of pixel blocks included in an input image 10. Therefore, the training network model may assign the same storage space to store a texture patch to each of a plurality of classes, or assign a larger storage space to a specific class as compared to the storage spaces of other classes.

According to an embodiment, the training network model may identify the class of each of the plurality of pixel blocks included in the input image 10, and change the size of the storage space of a memory 110 corresponding to at least one of the plurality of classes based on the identification frequency of each of the plurality of classes. For example, the training network model may assign additional storage space to store texture patches to a class identified more than a predetermined frequency according to the identification frequency to increase the size of the storage space of the memory 110. The predetermined frequency, by way of example, may be 20%, indicating that a specific class is identified for more than 20% of the total number of pixel blocks. However, it is understood that this is only an example, and one or more other embodiments are not limited thereto. For example, the predetermined frequency may vary according to one or more other embodiments, such as 10%, 15%, 30%, 50%, etc. By way of another example, the training network model may increase the size of the storage space corresponding to the most frequently identified class (or a predetermined number of most frequently identified classes such as the most frequently identified class, the second most frequently identified class, and the third most frequently identified class) based on the identification frequency.

For example, based on multiple pixel blocks among the plurality of pixel blocks included in the input image 10 corresponding a fourth class, the training network model may increase the size of the storage space on the memory 10 corresponding to the fourth class.

According to an embodiment, based on the pixel block being identified as corresponding to the fourth class, the training network model may identify the first similarity between the pixel block and the fourth class, and the second similarity between the texture patches pre-stored in the fourth class and the fourth class. In this case, the training network model may maintain the pre-stored texture patch based on the first similarity being smaller than the second similarity, and may additionally store the pixel block in the fourth class. In this case, the pre-stored texture patch may be prior to (or prioritized above) the pixel block.

By way of another example, the training network model may additionally store the pixel block in the fourth class based on the first similarity being larger than the second similarity. The priority of the pre-stored texture patch may be changed to a lower position, and the pixel block may have a higher priority than the pre-stored texture patch.

By way of yet another example, the training network model may change the size of the storage space of the memory 110 so that a predetermined number of texture patches could be stored in the most frequently identified class based on the identification frequency for each of the plurality of classes, and another predetermined number of texture patches less than the predetermined number could be stored in the second most frequently class. For example, the training network model may change the size of the storage space so that 10 texture patches at maximum could be stored in the most frequently identified fourth class, and 6 texture patches at maximum could be stored in the second most frequently identified second class. The specific numbers are only examples, and it is understood that the number of texture patches that can be stored may vary.

It should be understood that the training network model may not always add the pixel block as a texture patch corresponding to the identified class, and if the similarity between the pixel block and the identified class is smaller than a predetermined value, the pixel block may not be added. For example, if the similarity between the pixel block and the identified class is less than 50%, the training network model may not add the pixel block as the texture patch of the identified class.

According to an embodiment, the training network model may remove a texture patch corresponding to a class identified less than a predetermined number of times (or less than a predetermined frequency) from the memory 110 in identifying the class of each of the plurality of pixel blocks included in the input image 10. The training network model may reassign the storage space of the memory 110 to one or more other classes.

For example, as a result of identifying the class of each of the plurality of pixel blocks, when the number of pixel blocks corresponding to the third class is less than a predetermined number, the training network model may remove one or more texture patches pre-stored in the third class, and assign the storage space to store a texture patch in the other classes. Accordingly, the training network model may increase the size of the storage space for another class so that the plurality of texture patches could be stored in the most frequently identified class.

By way of another example, the training network model may remove the least frequently identified class based on the identification frequency and re-assign the storage space pre-assigned to that class to one or more other classes.

Figure 11:
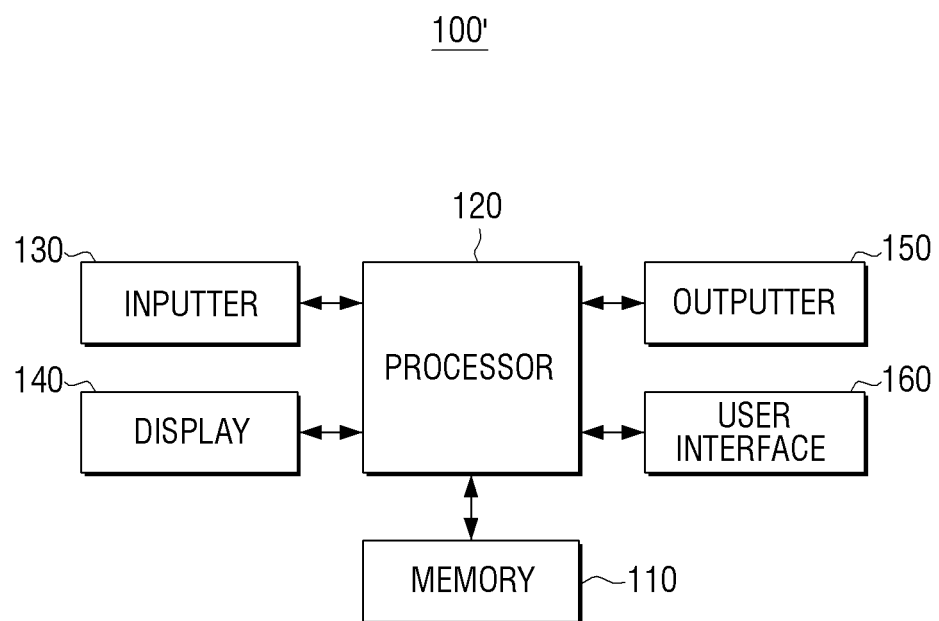
FIG. 11 is a block diagram illustrating a detailed configuration of an image processing apparatus according to an embodiment.

FIG. 11 is a block diagram to explain a detailed configuration of an image processing apparatus 100' according to an embodiment.

Referring to FIG. 11, an image processing apparatus 100' may include a memory 110, a processor 120, an inputter 130, a display 140, an outputter 150, and a user interface 160. Redundant descriptions of configurations of FIG. 2 may be omitted below.

According to an embodiment, the memory 110 may be embodied as a single memory for storing data generated in various operations.

According to another embodiment, the memory 110 may be embodied to include a plurality of memories, e.g., first to third memories.

The first memory may store at least part of the image (e.g., image frame) input through the inputter 130. The first memory may store at least a partial area of the input image frame. The at least partial area may be an area necessary or used for performing image processing. According to an embodiment, the first memory may be embodied as an N line memory. For example, the N line memory may be a memory for having a capacity of 17 lines in a vertical direction, but the disclosure is not limited thereto. In this case, when a Full HD image of 1080p (resolution of 1,920×1,080) is input, only the image area in 17 lines of the Full HD image may be stored in the first memory. The partial area of the input image frame may be stored for image processing because the memory capacity of the first memory may be limited due to a hardware limitation. The second memory may be a memory for storing at least one obtained texture patch 30, and embodied as memories of various sizes according to various embodiments. For example, according to an embodiment, when a memory is embodied to obtain and store all texture components corresponding to respective pixel values of an input image 10 to be applied to the input image 10, the second memory may be embodied in a size equal to or greater than the input image 10. According to another embodiment, in the case of applying a texture component in a unit of an image corresponding to the size of the first memory, or in the case of applying the texture component obtained in a pixel line unit on a pixel line basis, the memory may be embodied in a size appropriate for image processing. The second memory refers to a memory area assigned to the training network model of the entire area of the memory 110.

The third memory may be a memory for storing the output image that is image processed by applying the obtained texture components, and embodied in memories of various sizes according to various embodiments. For example, when the third memory is embodied to obtain and display an output image by applying the texture components corresponding to pixel values of the input image 10, the third memory may be embodied in a size equal to or larger than the size of the input image 10. According to another embodiment, when the third memory outputs an image in an image unit corresponding to the size of the first memory, or in a line unit corresponding to the patch size, the third memory may be embodied in a size appropriate for storing the image.

However, the third memory may not be necessary or used when the output image is overwritten in the first memory or the second memory, or when the output image is directly displayed or output (e.g., transmitted or provided to an external display device) without being stored.

The inputter 130 may receive various types of contents, for example, image signals. For example, the inputter 140 may receive image signals in a streaming method or a download method from an external server (e.g., a source device), an external storage medium (e.g., a USB), an external server (e.g., a web or cloud storage), etc., through communication methods such as AP-based Wi-Fi (WiFi, Wireless LAN network), Bluetooth, Zigbee, wired/wireless Local Area Network (LAN), WAN, Ethernet, IEEE-1394, High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI), etc. The image signals may be digital signals, but the disclosure is not limited thereto.

The display 140 may be embodied in the various forms such as a liquid crystal display (LCD), an organic light-emitting diode (OLED), a light-emitting diode (ED), a micro LED, a liquid crystal on silicon (LCoS), a Digital Light Processing (DLP), a quantum dot (QD) display panel, and the like.

The outputter 150 may output sound signals.

For example, the outputter 150 may convert the digital sound signal processed by the processor 120 into an analog sound signal, and amplify and output the analog sound signal. In this case, the outputter 150 may include at least one speaker unit, a digital-to-analog (D/A) converter, an audio amplifier, etc., that outputs at least one channel. For example, the outputter 150 may include an L channel speaker and/or an R channel speaker that reproduce an L channel and an R channel, respectively. However, the disclosure is not limited thereto. The outputter 150 may be embodied in various forms. For another example, the outputter 150 may be embodied in the form of sound bar that reproduces the L channel, the R channel, and the Center channel.

The user interface 160 may be embodied as at least one of a button, a touch pad, a trackpad, a rotatable dial, a mouse, a keyboard, etc., and/or embodied as a touch screen, a remote control receiving unit that is capable of performing the display function and the operation input function described above, etc. The button may include various types of input means such as a mechanical button, a touch pad, a dial, etc., formed in one or more areas such as a front part, a side part, a rear part, etc., of the outside of the body of the image processing apparatus 100'.

Furthermore, a filtering for removing noise of an input image before image processing could be additionally applied. For example, distinct noise may be removed by applying a smoothing filter such as a Gaussian filter, a guided filter, etc., that filters the input image against a predetermined guidance.

Figure 12:
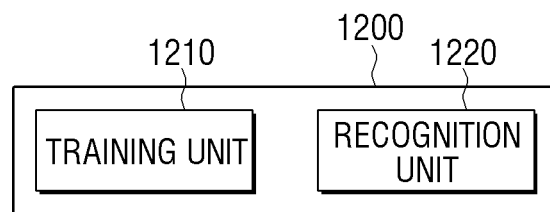
FIG. 12 is a block diagram to explain a configuration of a processor for training and using a training network model according to an embodiment.

FIG. 12 is a block diagram to explain a configuration of a processor 1200 of an image processing apparatus for training and using a training network model according to an embodiment.

Referring to FIG. 12, the processor 1200 may include at least one of a training unit 1210 (e.g., trainer) and a recognition unit 1220 (e.g., recognizer). The processor 120 of FIG. 11 may correspond to the processor 1200 of the image processing apparatus 100 or a data training server.

The training unit 1210 may generate or train a recognition model having a reference for identifying the class of the pixel block 20, and a recognition model having a reference for obtaining the texture patch 30 corresponding to the pixel block 20 according to the class. The training unit 1210 may generate a recognition model having a determination reference using the collected training data.

For example, the training unit 1210 may generate, train, or renew (e.g., update) the recognition model for determining the class corresponding to the pixel block 20 by using the pixel block 20 included in the image as training data.

By way of another example, the training unit 1210 may compare the similarity between the pixel block 20 and the class with the similarity between the texture patch 30 and the class and generate, train, or renew the recognition model for determining whether the texture patch 30 has been updated.

The recognition unit 1220 may use predetermined data or a predetermined type of data (e.g., an input image 10) as input data of the trained recognition mode, and estimate the recognition target or situation included in predetermined data.

For example, the recognition unit 1220 may use the pixel block 20 of the input image 10 as input data of the trained recognition model and identify the class and the texture patch 30 of the pixel block 20.

At least part of the training unit 1210 and at least part of the recognition unit 1220 may be embodied as a software module and/or manufactured in the form of one or a plurality of hardware chips to be mounted on the electronic apparatus, e.g., image processing apparatus 100. For example, at least one of the training unit 1210 and the recognition unit 1220 may be manufactured in the form of a hardware chip for Artificial Intelligence (AI) only, or manufactured as a part of an existing general processor (e.g. a CPU or an application processor) or a graphics processor (e.g., a GPU) to be mounted on the electronic apparatuses in a variety of types. The hardware chip for, e.g., dedicated to, Artificial Intelligence (AI) may be a processor specialized for probability computation having a higher parallel processing performance than a related art general processor, thereby quickly performing an arithmetic operation in the artificial intelligence field such as machine training. When the training unit 1210 and the recognition unit 1220 are implemented as a software module (or a program module including an instruction), the software module may be or may be stored in a non-transitory computer readable media. In this case, the software module may be provided by an operating system (OS), by a predetermined application, and/or by one or more instructions. Alternatively, some of the software modules may be provided by an Operating System (OS), and some of the software modules may be provided by a predetermined application.

In this case, the training unit 1210 and the recognition unit 1220 may be mounted on a single image processing apparatus 100, or separately mounted on each or plural processing apparatuses (e.g., plural image processing apparatuses). For example, one of the training unit 1210 and the recognition unit 1220 may be included in the image processing apparatus 100, and the other may be included in an external server. In addition, in a wired or wireless manner, the model information established by the training unit 1210 may be provided to the recognition unit 1220, and the data input into the training unit 1210 may be provided to the training unit 1210 as additional training data.

Figure 13:
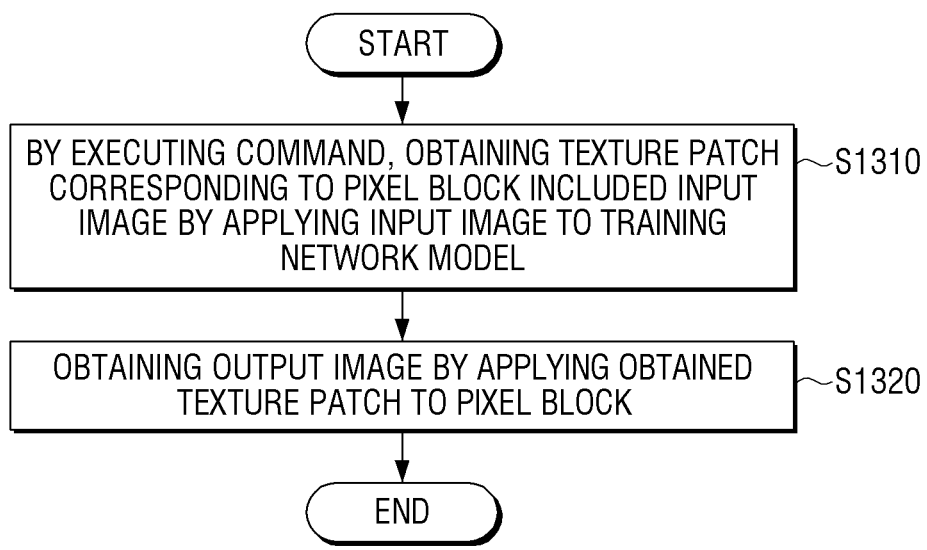
FIG. 13 is a flowchart to explain an image processing method according to an embodiment.

FIG. 13 is a flowchart to explain an image processing method according to an embodiment.

According to an image processing method of FIG. 13, a texture patch corresponding to a pixel block included in an input image may be obtained by applying the input image to the training network model at operation S1310.

The output image may be obtained by applying the obtained texture patch to the pixel block at operation S1320.

The training network model may store the texture patch corresponding to each of a plurality of classes classified based on one or more characteristics of the image, and train the texture patch corresponding to each of the plurality of classes based on the input image.

The training network model may identify one of the plurality of classes based on the characteristic of the pixel block, output the texture patch corresponding to the identified class, and compare a first similarity between the pixel block and the identified class with a second similarity between the texture patch and the identified class to identify whether to update the texture patch.

The training network model may replace the texture patch corresponding to the class identified based on the first similarity and the second similarity with the pixel block, or add the pixel block as the texture patch corresponding to the identified class.

If the first similarity is smaller than the second similarity based on the comparison result, the training network model may maintain the texture patch corresponding to the identified class. Further, if the first similarity is greater than the second similarity, the training network model may update the texture patch based on the pixel block.

When (e.g., based on) the texture patch corresponding to the identified class includes a plurality of texture patches, the training network model may identify one of the plurality of texture patches based on the correlation between the pixel block and each of the plurality of texture patches.

The training network model may train the texture patch based on the at least one of a storage time of the texture patch corresponding to each of the classes and an application frequency of the texture patch.

Further, when (e.g., based on) the pixel block is determined to not correspond to one of the plurality of classes based on the characteristic of the pixel block, the training network model may generate a new class based on the characteristic of the pixel block, map the pixel block to the new class.

The plurality of classes may be classified based on at least one of average, variance, pixel coordinate, edge strength, edge direction or color of pixel values.

The obtaining of the output image at operation S1320 may include obtaining the weighed value for the texture patch based on the correlation between the obtained texture patch and the pixel block, and outputting an output image by applying the texture patch to which the weighed value is applied to the pixel block.

The output image may be a 4K Ultra High Definition (UHD), or an 8K UHD image, but it is understood that one or more other embodiments are not limited thereto. Indeed, it is understood that the present concept(s) can be applied to an upscaling or output of an image of any resolution, including those less than 4K and those greater than 8K.

Various embodiments could be applied to all kinds of electronic apparatuses including an image receiving apparatus such as a set-top box, and audio/video receiver, a media streaming device, etc., or any type of image processing apparatus.

Various embodiments described above may be implemented in a recording medium that can be read by a computer or a similar device using software, hardware, or a combination thereof. In some cases, embodiments described herein may be implemented by a processor 120, 1200 itself. According to software implementation, embodiments such as the procedures and functions described herein may be implemented in separate software modules. Each of the software modules may perform one or more of the functions and operations described herein.

Computer instructions for performing processing operations of a device in accordance with various embodiments described above may be stored in a non-transitory computer-readable medium. The computer instructions stored in the non-volatile computer-readable medium cause a particular device to perform the processing operations on the device according to various embodiments described above when executed by the processor of the particular device.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although embodiments have been shown and described, it will be appreciated by those skilled in the art that changes may be made to these embodiments without departing from the principles and spirit of the disclosure. Accordingly, the scope of the present inventive concept(s) is not construed as being limited to the above embodiments, but is defined by at least the appended claims as well as equivalents thereto.

What is claimed is:
1. An image processing apparatus, comprising:
a memory configured to store at least one instruction; and
a processor electrically connected to the memory,
wherein the processor, by executing the at least one instruction, is configured to:

apply an input image to a training network model, and
obtain a texture patch outputted from the training network model to correspond to a pixel block included in the input image,
apply the texture patch to the pixel block to obtain an output image,
wherein the training network model stores a plurality of texture patches corresponding to a plurality of classes classified based on a characteristic of a pixel block, identifies a class among the plurality of classes, based on a characteristic of the pixel block included in the input image, outputs the texture patch corresponding to the identified class, and updates at least one texture patch, among the plurality of texture patches, based on the input image.

2. The apparatus as claimed in claim 1, wherein the training network model is configured to compare a first similarity between the pixel block included in the input image and the identified class with a second similarity between the texture patch and the identified class, and to determine whether to update the texture patch based on the comparison.

3. The apparatus as claimed in claim 2, wherein the training network model is configured to replace the texture patch corresponding to the identified class with the pixel block based on the comparison, or to add the pixel block as another texture patch corresponding to the identified class.

4. The apparatus as claimed in claim 2, wherein:
based on the first similarity being less than the second similarity according to the comparison, the training network model is configured to maintain the texture patch corresponding to the identified class; and
based on, the first similarity being greater than the second similarity according to the comparison, the training network model is configured to update the texture patch based on the pixel block.

5. The apparatus as claimed in claim 2, wherein, based on the texture patch corresponding to the identified class including more than one texture patch, the training network model is configured to identify one of the more than one texture patch based on a correlation between the pixel block and each of the more than one texture patch.

6. The apparatus as claimed in claim 1, wherein the training network model is configured to update the at least one texture patch based on at least one of a storage time of the at least one texture patch, and an application frequency of the at least one texture patch.

7. The apparatus as claimed in claim 1, wherein, based on the pixel block being determined to not correspond to one of the plurality of classes in accordance with the characteristic of the pixel block included in the input image, the training network model is configured to generate a new class based on the characteristic of the pixel block included in the input image, and to map and store the pixel block to the new class.

8. The apparatus as claimed in claim 1, wherein the training network model is configured to identify a class corresponding to each of a plurality of pixel blocks included in the input image, and to change a size of a storage space of the memory corresponding to at least one of the plurality of classes based on an identification frequency of each of the plurality of classes.

9. The apparatus as claimed in claim 8, wherein the training network model is configured to remove, from the memory, a texture patch corresponding to a class identified less than a predetermined number of times based on the identification frequency, and to assign a storage space obtained as a result of the removal to other classes.

10. The apparatus as claimed in claim 1, wherein the plurality of classes are classified based on at least one of an average pixel value, a pixel coordinate, a variance, an edge strength, an edge direction, or a color.

11. The apparatus as claimed in claim 1, wherein the processor is further configured to:
obtain a weighted value for the texture patch based on a correlation between the texture patch and the pixel block, and
obtain the output image by applying, to the pixel block, the texture patch to which the weighted value is applied.

12. The apparatus as claimed in claim 1, wherein the output image is a 4K Ultra High Definition (UHD) image or an 8K UHD image.

13. An image processing method of an image processing apparatus, the method comprising:
applying an input image to a training network model; and
obtaining a texture patch outputted from the training network model to correspond to a pixel block included in the input image,
applying the texture pattern to the pixel block to obtain an output image,
wherein the training network model stores a plurality of texture patches corresponding to a plurality of classes classified based on a characteristic of a pixel block, identifies a class, among the plurality of classes, based on a characteristic of the pixel block included in the input image, outputs the texture patch corresponding to the identified class, and updates at least one texture patch, among the plurality of texture patches, based on the input image.

14. The method as claimed in claim 13, wherein the training network model compares a first similarity between the pixel block and the identified class with a second similarity between the texture patch and the identified class, and determines whether to update the texture patch based on the comparison.

15. The method as claimed in claim 14, wherein the training network model replaces the texture patch corresponding to the identified class with the pixel block based on the comparison, or adds the pixel block as another texture patch corresponding to the identified class.

16. The method as claimed in claim 14, wherein:
based on, the first similarity being less than the second similarity according to the comparison, the training network model maintains the texture patch corresponding to the identified class; and
based on the first similarity being greater than the second similarity according to the comparison, the training network model updates the texture patch based on the pixel block.

17. The method as claimed in claim 14, wherein, based on the texture patch corresponding to the identified class including more than one texture patch, the training network model identifies one of the more than one texture patch based on a correlation between the pixel block and each of the more than one texture patch.

18. The method as claimed in claim 13, wherein the training network model updates the at, least one texture patch based on at least one of a storage time of the at least one texture patch, and an application frequency of the at least one texture patch.

19. The method as claimed in claim 13, wherein, based on the pixel block not corresponding to one of the plurality of classes in accordance with the characteristic of the pixel block the training network model generates a new class based on the characteristic of the pixel block included in the input image, and maps and stores the pixel block to the new class.

20. The method as claimed in claim 13, wherein the plurality of classes are classified based on at least one of an average pixel value, a pixel coordinate, a variance, an edge strength, an edge direction, or a color.

* * * * *